Patented June 12, 1951

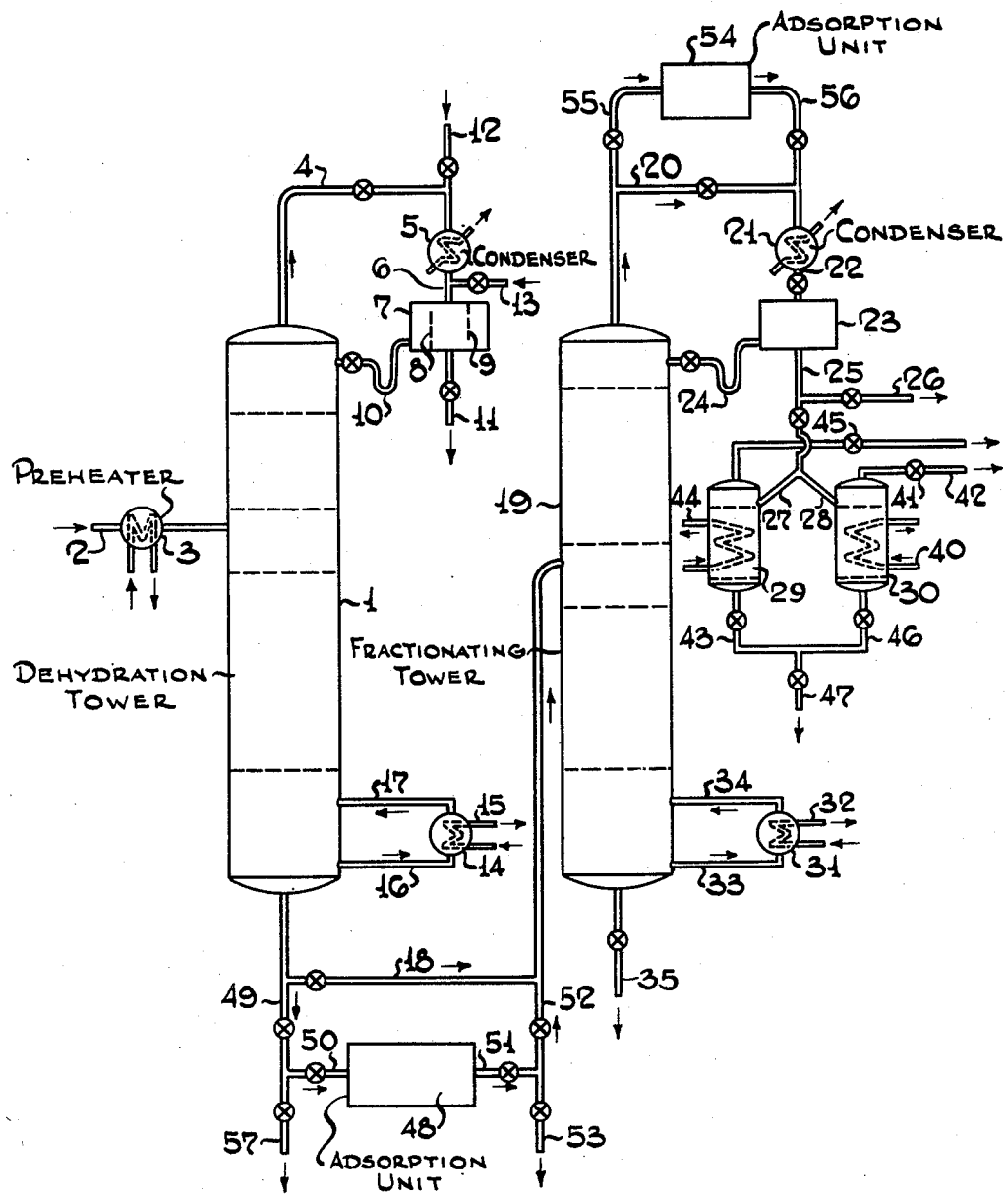

2,556,248

UNITED STATES PATENT OFFICE 2,556,248

ETHER PURIFICATION BY DISTILLATION AND ADSORPTION

Erwin H. Amick, Jr., Linden, N. J., assignor to Standard Oil Development Company, a corporation of Delaware Application March 16, 1946, Serial No. 654,975

4 Claims. (Cl. 202—42)

This invention relates to a method of finishing a commercial ether product to obtain a high grade of ether which is substantially anhydrous and alcohol-free. More particularly, it relates to a treatment which is economically adapted for use in finishing a crude ether produced on a large industrial scale.

High grades of chemically pure, anhydrous, and reagent grade ethyl ethers have been manufactured in the past on a small scale for use as laboratory agents or as special solvents. To obtain the required high degree of purity required for these grades, it was generally deemed necessary that the ether be produced by a reaction of rather pure ethanol and sulfuric acid followed by lengthy steps of washing, neutralizing, special chemical treating, and redistilling. An involved purification treatment was considered necessary for removal of substantially all impurities, such as aldehydes, free acid, non-volatile matter, peroxides, odor and color forming substances, and all but the merest traces of alcohol and water.

In the development of alcohol syntheses from olefins on a large scale, large amounts of crude ether by-products have become available, leading to the necessity of refining the crude ethers on a large industrial scale in order to obtain commercially salable and high grade ether products.

An object of this invention is to provide a method of purification that can be used flexibly in a large scale refining of a crude ether to obtain any desired quantity of a high grade ether.

A further object of this invention is to provide an economical ether purification treatment which is adapted for use in combination with a large scale distillation refining on a continuous basis with avoidance of time- and material-consuming steps.

Other objects and advantages of this invention will be made apparent in the following description.

Crude ethers normally formed in synthesizing alcohols from olefins contain water, alcohol, polymers, and other higher boiling substances as chief impurities. Also, they usually contain small amounts of a water-soluble organic impurity such as an aldehyde or ketone.

In the present invention, an adsorbent material, such as silica gel, is efficiently employed to free ether of impurities that have been most difficult to remove.

The adsorption treatment is applied with particular effectiveness to partially refined ethers from which water-insoluble impurities and major parts of water or of both water and alcohol impurities are removed. These partially refined ethers contain some alcohol and water impurities to be further removed in obtaining the high-grade products, but the substantially complete removal of water and alcohol required and effected by the adsorption treatment is not feasible practically by distillation.

The adsorption treatment is advantageously combined with a continuous distillation procedure where the adsorbent material efficiently serves to selectively remove both alcohol and water impurities from the ether.

In the procedure for removing a major part of water impurity from a crude ether by distillation, the vaporized water is taken overhead by ether vapor in a dehydration tower. The composition of the overhead vapor, assuming that the number of plates and the reflux ratio are sufficient, approaches the composition of an ether-water azeotrope which exists at the tower operating pressure. In order to effect separation of water without loss of ether, the overhead vapor mixture is condensed, and, if necessary, cooled to such a level that two liquid phases form: an ether-rich phase and a water-rich phase. The ether-rich phase is refluxed to the tower, while the water-rich phase is separately removed from the system.

For example, if crude ethyl ether containing water is fractionated at ordinary pressure, the overhead contains about 1.2 weight per cent water, and it is necessary to condense and cool the overhead to about 20° C. (68° F.) before two liquid phases form. Investigations have shown that the condensate temperature for the ethyl ether-water azeotrope has to be considerably below 20° C. before an appreciable quantity of the water phase is formed at ordinary pressure; therefore, it has been found desirable to operate the dehydrating tower at a super-atmospheric pressure so that the azeotrope composition is such that two liquid phases are formed on condensing and cooling with a cooling water at its available temperature. This operation at superatmospheric pressure avoids the use of a refrigeration system for direct or indirect cooling of the condensate. Operation of the dehydrating tower at superatmospheric pressures in the range of 100–150 pounds per square inch gauge has proved satisfactory, but it is feasible to operate at pressures approaching the critical pressure of the system.

If the crude ether contains a water-soluble impurity more volatile than the ether, e. g., acetaldehyde in crude ethyl ether or acetone in crude isopropyl ether, such impurity can be distilled overhead from the tower with the ether-water azeotropes.

In the purification of crude ethyl ether, for example, the ether and acetaldehyde were found to form a minimum boiling point azeotrope, which in the absence of sufficient water does not undergo separation by distillation overhead but results in concentration of acetaldehyde at the top of the tower and in the reflux. Even under ordinary operating conditions when sufficient water is present to form a water-ether azeotrope, acetaldehyde is taken overhead but the amount of separation obtained is generally insufficient to avoid accumulation of the acetaldehyde in the tower. However, by imposing a sufficiently high superatmospheric pressure on an equilibrium mixture of ethyl ether, water, and acetaldehyde vapors, the water content of the mixture is increased, e. g., to above 3 per cent by weight at 100 pounds per square inch gauge, so that on condensing and cooling the vapor mixture, separation of a major amount of the water and acetaldehyde may be obtained to avoid accumulation of the acetaldehyde in the tower.

Although increasing the superatmospheric pressure on the equilibrium vapor mixture passed overhead from a dehydrating tower makes possible the removal of the acetaldehyde impurity, a maximum economical pressure is reached. Therefore, another effective step has been devised for obtaining separation of the acetaldehyde from the ether in the overhead mixture, as will be explained next.

The acetaldehyde impurity is effectively separated from the ether in the overhead mixture by addition of steam to the overhead vapor mixture or by the addition of water to condensed overhead without the use of excessive pressure in the tower, especially when the acetaldehyde impurity content in the crude ether runs above 0.1 weight per cent. Either the addition of steam or water to the overhead mixture serves to increase the volume of the aqueous phase and thus increases the capacity of the aqueous phase to carry the water-soluble material from the system. If no step is taken to remove the water-soluble impurity, the efficiency of the dehydration tends to be seriously impaired by the accumulation of the water-soluble impurity in the top of the dehydration tower and in the overhead system. This impurity adversely affects phase separation with the result that the reflux to the tower will contain excessive water and the aqueous phase will contain more than the normal amount of ether.

The amount of water or steam required to be added to an overhead vapor mixture from a dehydration tower is a direct function of the amount of volatile water-soluble impurity in the crude ether feed to the tower. The water requirement is kept as low as possible by insuring equilibrium between the added water and the condensate from the overhead vapors, using any suitable means such as an agitator, orifice mixer, or countercurrent flow, if desired, for obtaining intimate mixing. The system may be simplified mechanically by adding steam to the overhead vapor mixture, since steam is usually available at a pressure such that it can be directly added without the use of pumps.

The dehydration tower bottoms substantially free of impurities more volatile than the ether and free of all but a small quantity of water are in condition for distillation in a second tower to remove higher boiling organic compounds.

Ethyl ether removed as an overhead product on distilling the dehydration tower bottoms in a second tower contains small quantities of water and ethyl alcohol but is substantially free of other high boiling impurities. This overhead product then only needs to be treated either in the liquid phase or vapor phase by an adsorbent like silica gel to obtain a high-grade ether which is substantially anhydrous and alcohol-free.

If a crude ethyl ether initially contains little alcohol, or is washed prior to dehydration to remove all but a very small quantity of alcohol, it is advantageous to treat the ether bottoms from the dehydration tower with the adsorbent in order to remove final traces of alcohol and water before the final distillation, because in the presence of alcohol or water, or both, azeotropes are often formed which add to the difficulty of separating the ether from higher boiling impurities that remain in the dehydration tower bottoms. By interposing the selective adsorption treatment between the dehydration tower and the final distillation tower, the overhead from the final distillation tower will be a finished ether of premium grade, substantially free of water, alcohol, and high boiling impurities.

For a more detailed description of the process, reference is made to the accompanying drawing, wherein is shown diagrammatically a flow plan of a combined continuous distillation and adsorption treating system for performing the purification process as applied to ethyl ether. It will be understood that variations may be made in the system to attain the objects of the invention.

Referring to the drawing, a crude ethyl ether, containing the usual impurities mentioned, is charged into a mid-section of dehydration tower 1 from feed line 2. Tower 1 contains packing sections (not shown), such as ceramic packing or similar means for providing intimate contact of vapors with liquids. Although it is not necessary for the purposes of this invention, it is generally desirable to preheat the feed charged to tower 1 in a heat exchanger or preheater unit 3.

Overhead vapors are withdrawn from tower 1 by line 4 to a cooling condenser 5.

Ether and water condensates are passed from condenser 5 through line 6 to receiver 7, which may be provided interiorly with a baffle arrangement to aid in separating two liquid phases. The condensates entering the receiver 7 between a weir baffle 8 and a depending baffle 9 separate into two liquid phases under suitable conditions explained.

An ether-rich liquid phase containing a small amount of dissolved water separates as an upper layer. The ether-rich liquid phase is decanted from receiver 7 and is returned as reflux by line 10 to tower 1.

The water-rich phase, which separates in receiver 7 as a lower layer, is withdrawn from the receiver 7 by line 11, using the dehydration system described. A major portion of water impurity is separated from the ether continuously under suitable operating conditions. The water separated in the water-rich phase withdrawn from the receiver 7 constitutes a major portion of the water in the overhead vapors under these conditions. For example, if the tower is operated at 100 pounds per square inch gauge (114.7 pounds per square inch absolute), the overhead vapors will contain about 3.7 weight per cent of water, and the ether-rich reflux, cooled to 110° F., will contain about 1.5 weight per cent of water. Accordingly, the difference of approximately 2.2 weight per cent is continuously removed. The crude ether supplied to the tower operating under these conditions may be preheated in preheater 3 to about 215° F.

If a water-soluble impurity more volatile than the ether, such as acetaldehyde in crude ethyl ether, tends to accumulate at the top of the dehydration tower 1 and it is preferred not to increase the pressure, steam may be injected from line 12 into the overhead mixture as it is passed to condenser 5, or water may be introduced from line 13 into the condensate passed from condenser 5 to receiver 7. The quantity of steam or of water thus added may be proportioned to keep the amount of water-soluble impurity at a desired low level in the reflux.

Tower 1 is provided with a reboiler 14 containing a live steam heat exchange coil 15. Bottom liquids from tower 1 are circulated to this reboiler by line 16 and returned to tower 1 by line 17 to maintain sufficient heat in the tower for insuring vaporization of all but a very small amount of water from the bottoms.

Bottom liquids comprising mostly ether, some alcohol, a small amount of water, and some higher boiling organic materials are withdrawn from tower 1 and passed by line 18 to a second tower 19, which also contains a packing or equivalent means (not shown).

With a relatively lower pressure in tower 19, e. g., 25 pounds per square inch gauge, and under adjusted temperatures, vapors of ethyl ether rise in tower 19 and are withdrawn through overhead line 20 to cooling condenser 21. Condensate is passed from condenser 21 by line 22 to receiver 23, from which a portion of the condensate is refluxed to column 19 through line 24.

Another portion of condensate is withdrawn from receiver 23 by line 25 as a commercial, refined ether product. Any desired amount of this refined ether product may be passed through line 26 to storage, but another portion of this ether may be run through valve-controlled lines 27 and 28 to adsorption treating tanks 29 and 30 in regulated amount for higher purification.

Tower 19 is provided with a reboiler 31 including a steam coil 32 for heat exchange. Liquid bottoms of tower 19 are circulated between tower 19 and reboiler 31 by lines 33 and 34, and are discharged from tower 19 through line 35.

The ether condensate from the overhead of tower 19 collected in receiver 23 is generally sufficiently pure for most industrial uses after having been freed of volatile aldehyde and non-volatile impurities; however, this ether tends to contain considerably more alcohol and water than is permissible by specifications for the highest grades of ether. Therefore, further purification treatment for reducing the alcohol and water content to within tolerance limits of high grade ether products is important.

Although it has been well known that adsorbents, such as silica gel and its equivalents, can be used for removing water from organic liquids, including alcohols, it was not previously realized that such an adsorbent material could be used to selectively remove alcohol and water from an ether for refining the ether on a practicable scale. The ether condensate collected in receiver 22 as a product of the two-tower dehydration and fractionation treatment is suitable for the adsorption treatment.

The overhead ether product from the second fractionation tower 17 may generally contain above 0.5 per cent by weight of alcohol and water, and, at this point, the removal of the alcohol and water by selective adsorption is economical, taking into account that the adsorption capacity of the adsorbent is limited.

By using a plurality of interconnecting adsorption units as illustrated in the drawing, one unit may be operated on stream for treatment of ether from receiver 23 while another is being regenerated. For example, while ether condensate is sent to unit 29 through open feed line 27, alternate feed line 28 being closed, the unit 30 may be connected for regeneration by circulation of a heating fluid through coil 40, and desorbed vapors may be vented or evacuated through open valve 41 to the exhaust main 42. When unit 29 is connected for regeneration, the feed line 27 and withdrawal line 43 are closed, heating fluid is circulated through coil 44, and vent valve 45 is opened to exhaust vapors from the unit. Treated ether is withdrawn from units 29 and 30 by lines 43 and 46, respectively, to line 47, which conveys the purified ether to storage.

The adsorbent is regenerated at temperatures above about 212° F. under atmospheric or reduced pressure.

As previously mentioned, variations may be made in the positions of the adsorption treating units relative to the distillation system under particular circumstances.

Indicating an adsorption treating unit in a general manner at 48, a portion or all of the bottoms from dehydration tower 1 may be diverted from line 18 through lines 49 and 50 to flow through adsorbent in unit 48 for selective removal of small amounts of alcohol and water from the crude ether bottoms. The adsorbent-treated bottoms, thus made substantially anhydrous and free of alcohol, may then be passed by lines 51 and 52 to the finishing tower 19 or be withdrawn to storage by line 53. Any part of the bottoms from tower 1 may be removed from the system if desired by line 57 for separate treatment or use.

Use of adsorption units to treat bottoms from tower 1 is particularly desirable when these bottoms have a very low water and alcohol content.

If desired, all or part of the ether vapor overhead from tower 19 may be diverted from line 20 and made to pass by way of line 55 through a vapor phase adsorption treating unit indicated in a general manner at 54. The adsorbent-treated ether vapor leaving unit 54 by line 56 will give a high grade condensate in receiver 23. This treatment of the overhead vapor from tower 19 is particularly useful for avoiding accumulation of alcohol or water in tower 19.

Although use may be made of either unit 48 in treating the dehydration tower bottoms or of unit 54 in treating overhead vapors from tower 19 for eliminating the necessity of treating liquid ether distillate from tower 19 by adsorption units 29 and 30 as described, any two or all of these alternative adsorption treatments may be used in combination with the distillation.

The purification steps which have been described with reference mainly to ethyl ether are applicable to simple and mixed dialkyl ethers containing 4 to 6 carbon atoms per molecule. In general, these ethers are normally contaminated by alcohol and water impurities having higher boiling points and by water-soluble impurities having lower boiling points. For example, in the purification of crude isopropyl ether (B. P.

68.7° C.), isopropyl alcohol (B. P. 82.5° C.), and water (B. P. 100° C.) are the normal impurities to be removed. In subjecting the crude isopropyl ether to dehydration in a fractional distillation tower, e. g., tower 1, a ternary azeotrope or equilibrium vapor mixture is fractionally distilled at a constant boiling point of about 61° C. and the condensates of the vapor mixture separate into two liquid phases. The liquid phase of lower density is the ether-rich phase and contains about 91.7% isopropyl ether, 7.2% isopropyl alcohol, and 1.1% water. The denser phase which stratifies into a lower layer contains 90.2% water, 9.8% isopropyl alcohol, and only a trace of ether. The upper or ether-rich phase is refluxed to the vapor fractionating zone of the tower. If the water-soluble impurity acetone (B. P. 56.5° C.) is present, the acetone vapors are carried overhead with the azeotropic vapor mixture, but like the acetaldehyde in the distillation of crude ethyl ether, the acetone tends to concentrate at the top of the dehydration tower and in the overhead system unless a sufficient amount of water is admixed in the condensates from the dehydration tower to separate a major portion of the acetone in the aqueous phase. By the described treatment of the crude isopropyl ether in a dehydration tower and its overhead system, the distillation residue or bottoms is mainly composed of isopropyl ether with small amounts of water and alcohol that can be removed by selective adsorption.

I claim:

1. In the purification of crude ethyl ether containing water, alcohol, and acetaldehyde impurities, the steps which comprise distilling from the crude ether an ether-water azeotrope mixture in a distillation zone, admixing water in sufficient amount with the azeotrope mixture to retain a major proportion of acetaldehyde distillate in a water-rich condensate phase of the mixture, separating an ether-rich condensate phase from the distilled mixture, refluxing the ether-rich condensate phase to the distillation zone, collecting a residual portion of the crude ether from which water and acetaldehyde impurities have been removed by the distillation, fractionally distilling from said residual portion of the crude ether an ethyl ether distillate containing traces of water and ethyl alcohol impurities, treating a portion of said ethyl ether distillate with silica gel, and withdrawing from the silica gel a purified ethyl ether which is substantially anhydrous and alcohol-free.

2. In the purification of crude ethyl ether contaminated by water and ethyl alcohol, the steps which comprise distilling from the crude ether under reflux a major proportion of the water in a dehydration zone, collecting ether bottoms containing traces of water and ethyl alcohol in the dehydration zone, passing said ether bottoms into contact with silica gel that removes water and ethyl alcohol, then distilling from the ether bottoms a pure ethyl ether fraction.

3. A process for removing contaminating traces of water and ethyl alcohol in the neighborhood of 0.5 wt. per cent from ethyl ether containing these impurities which comprises distilling the impure ether in a distillation zone, removing a portion of the water as distillate in the form of the ethyl ether-water azeotrope, and treating the ether distillation residue with silica gel to adsorb the remainder of the water and the alcohol therefrom.

4. A process for removing contaminating traces of water and isopropyl alcohol in the neighborhood of 0.5 wt. per cent from isopropyl ether containing these impurities which comprises distilling the impure ether in a distillation zone, removing a portion of the alcohol and water as distillate from the distillation zone as a ternary azeotrope of water, isopropyl alcohol and isopropyl ether, and treating the ether distillation residue with silica gel to adsorb the remainder of the water and alcohol.

ERWIN H. AMICK, Jr.

REFERENCES CITED

The following references are of record in the file of this patent:

UNITED STATES PATENTS

| Number | Name | Date |
|---|---|---|
| 1,394,232 | Stevens | Oct. 18, 1921 |
| 1,413,864 | Mann | Apr. 25, 1922 |
| 1,454,462 | Backhaus | May 8, 1923 |
| 1,466,436 | Hammond | Aug. 28, 1923 |
| 1,536,544 | Willkie | May 5, 1925 |
| 1,537,260 | Patrick | May 12, 1925 |
| 1,670,053 | Steffens | May 15, 1928 |
| 1,911,832 | Lewis | May 30, 1933 |
| 2,140,694 | Evans | Dec. 20, 1938 |
| 2,198,651 | Bludworth | Apr. 30, 1940 |
| 2,275,802 | Othmer et al. | Mar. 10, 1942 |
| 2,306,610 | Barrer | Dec. 29, 1942 |
| 2,356,890 | Schultze | Aug. 29, 1944 |
| 2,358,193 | Wentworth | Sept. 12, 1944 |
| 2,388,616 | La Lande | Nov. 6, 1945 |
| 2,431,554 | Hansley | Nov. 25, 1947 |
| 2,458,819 | Yowell | Jan. 11, 1949 |

FOREIGN PATENTS

| Number | Country | Date |
|---|---|---|
| 211,454 | Great Britain | May 22, 1925 |
| 409,053 | Great Britain | Apr. 26, 1934 |

OTHER REFERENCES

Bartell et al.: "Adsorption by Silica and Carbon From Binary Organic Liquid Mixtures Over the Entire Concentration Range," Journal of the American Chemical Society, vol. 53, pp. 2507–2511, July 1931. (Copy in Sci. Lib.)

Kireev et al.: 29 Chemical Abstracts 1695 (1935). (Copy in Scientific Library.)